United States Patent [19]

Kryter

[11] 3,756,383

[45] Sept. 4, 1973

[54] STORAGE CASE FOR MAGNETIC TAPE CASSETTES, THEIR BOXES AND THE LIKE

[76] Inventor: Karl D. Kryter, P.O. Box 1149, Los Altos, Calif. 94022

[22] Filed: Apr. 12, 1972

[21] Appl. No.: 243,382

[52] U.S. Cl. ............ 206/1 R, 206/73, 206/DIG. 36, 220/20

[51] Int. Cl. .......................... B65d 5/50, B65d 85/67

[58] Field of Search .................... 206/1 R, 73, 62 R, 206/16 R, 65 R, DIG. 36; 220/20

[56] References Cited

UNITED STATES PATENTS

| | | | |
|---|---|---|---|
| 2,851,188 | 9/1958 | Pavelle | 206/65 K |
| 3,584,738 | 6/1971 | Wallace | 206/1 R |
| 3,606,007 | 9/1971 | Huston, Jr. | 206/73 |
| 3,674,132 | 7/1972 | Loss | 206/1 R |
| 3,710,900 | 1/1973 | Fink | 206/1 R |

*Primary Examiner*—William T. Dixson, Jr.
*Attorney*—Rines and Rines

[57] ABSTRACT

This disclosure deals with novel tape cassette and tape cassette box storage cases wherein sets of particularly positioned and spaced short horizontal and vertical ribs are provided at the front and rear faces of at least the bottom box portion of the case to enable transverse parallel storage of cassettes between the horizontal ribs and similar storage of the boxes therefor between the vertical ribs but with the latter elevated upon the horizontal ribs.

7 Claims, 3 Drawing Figures

STORAGE CASE FOR MAGNETIC TAPE CASSETTES, THEIR BOXES AND THE LIKE

Figure 1:
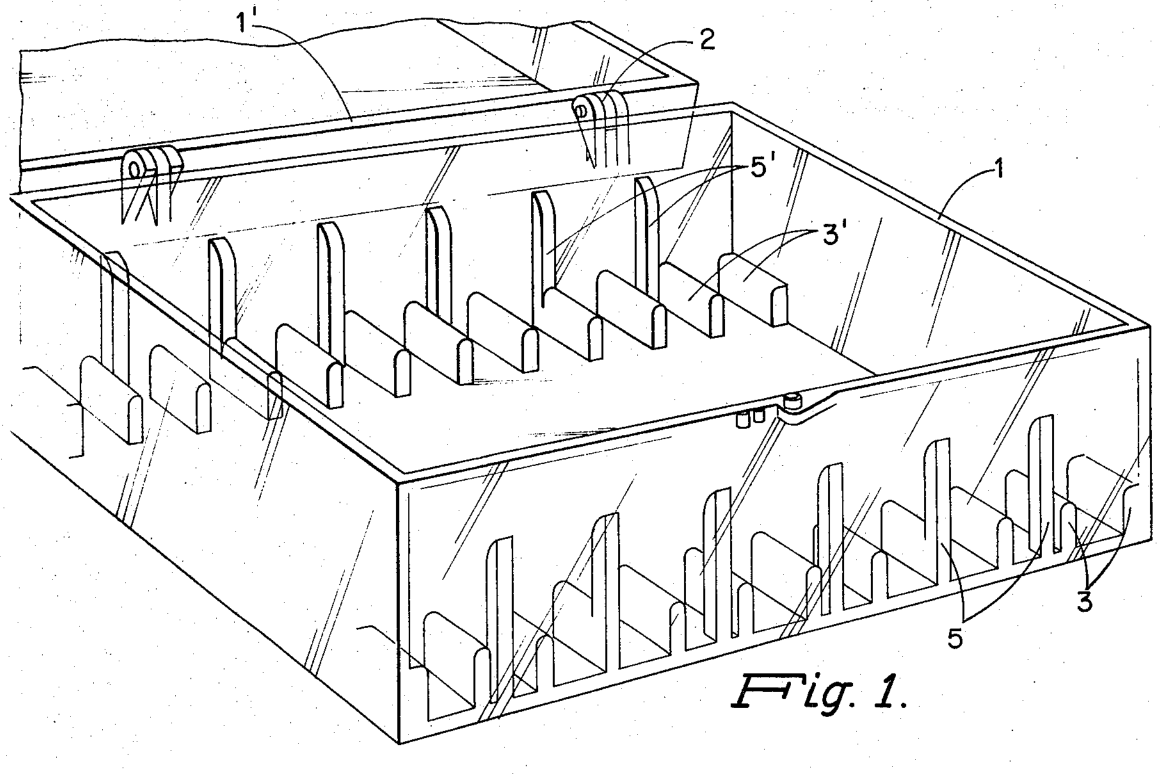

The present invention relates to storage cases, being more particularly directed to cases for storing in transverse, parallel relation, thin magnetic tape cassettes and the like and/or their somewhat thicker boxes, in any desired combination and relative quantities of the same.

The art is replete with storage cases of all kinds having myriads of different dividers, compartments and ribbed configurations for containing the stored contents. The nature of these many constructions, however, forbids great flexibility in storing different-dimensioned items without either changing the position of dividers or compartments to adjust for the different numbers of different-dimensioned items that happen to be at hand at different times, or wasting space by using a large inflexible space that was formed for large items, when only a small item is on hand for storage. This problem is particularly of conern where items to be stored may or may not be contained in their own boxes, which, of course, are inherently of greater dimensions than the itmes. Among such items are magnetic tape cassettes and the like.

It is to the solution of this problem, with a very inexpensive construction, accordingly, that the present invention is directed as its primary object.

A further object is to provide a novel storage case of more general utility, as well.

Other and further objects will be explained hereinafter and are more particularly pointed out in the appended claims. In summary, however, the invention in one of its primary aspects relates to a storage case for transversely storing magnetic tape cassettes and their boxes having, in combination, a substantially rectangular bottom box portion for receiving and storing such cassettes and their boxes in transverse parallel position, and a rearwardly hinged top portion for the bottom box portion of the storage case; the bottom box portion being of height less than that of the tape cassettes and of their boxes, of width slightly greater than the length of the cassette boxes, and of length many times the width of the cassette boxes, and the top portion therefor being of height at least sufficient, when closed, to cover the cassettes and their boxes, transversely positioned within the case; two similar sets of spaced horizontal position locking ribs of short vertical dimension disposed upon the bottom wall of the storage case bottom box portion, respectively extending inward a short horizontal distance only from the inner surfaces of the front and rear walls of the bottom box portion with the successive ribs being substantially equally longitudinally spaced from one another, and with the ribs adjacent the side walls of the bottom box portion being similarly spaced, a distance just slightly greater than the width of the cassettes in order reliably transversely to position, store and maintain the same against dislodging in parallel locations within the case; and two similar sets of spaced vertical position locking rib means of longer vertical dimension than the horizontal ribs but of shorter horizontal dimensions respectively disposed from said bottom wall vertically along the inner surfaces of said front and rear walls of the bottom box portion, and defining spaces between vertical rib means just slightly greater than the width of the cassette boxes, such vertical rib means being positioned so as intermediately to include a horizontal rib therebetween in order reliably transversely to position, store and maintain the same against dislodging in parallel locations within the case, but with the boxes elevated above the said bottom wall and resting upon and stabalized by the intermediate horizontal ribs. Preferred details are later set forth.

Figure 2:
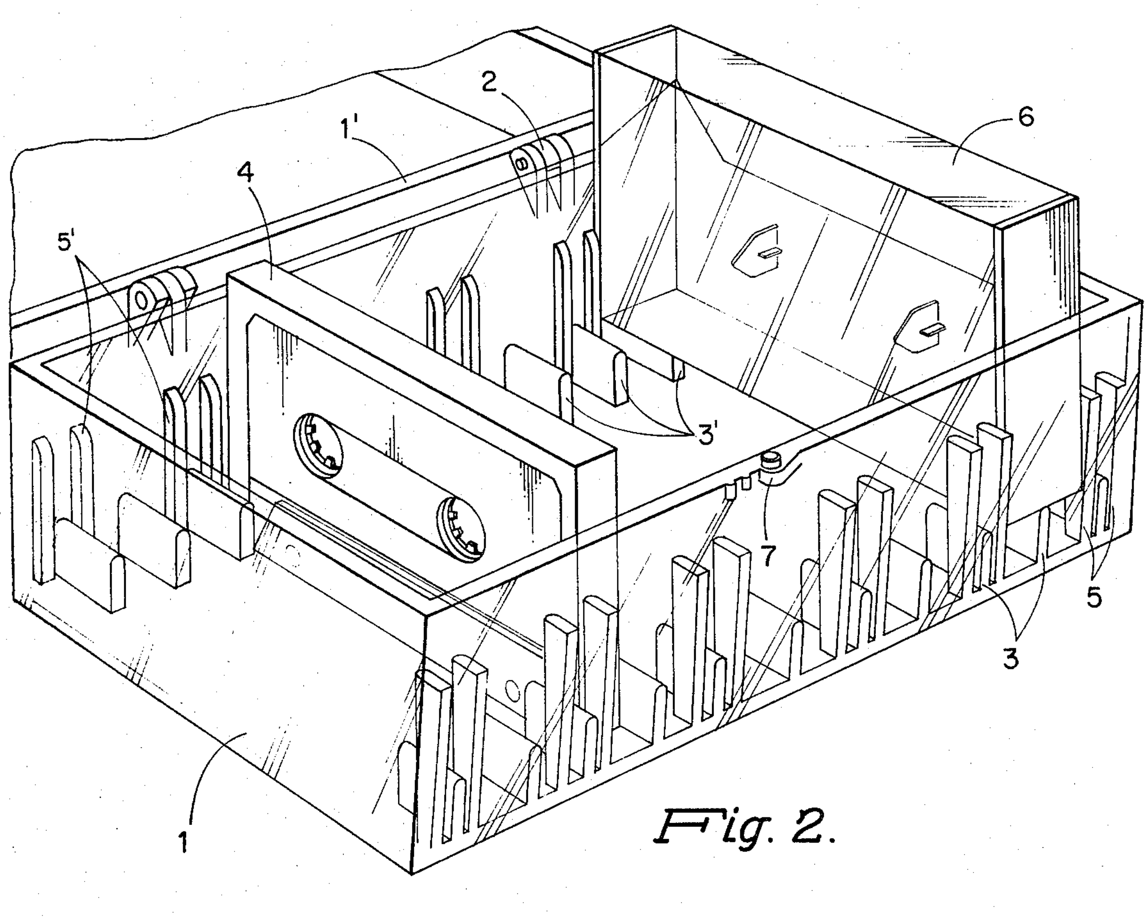
Figure 3:
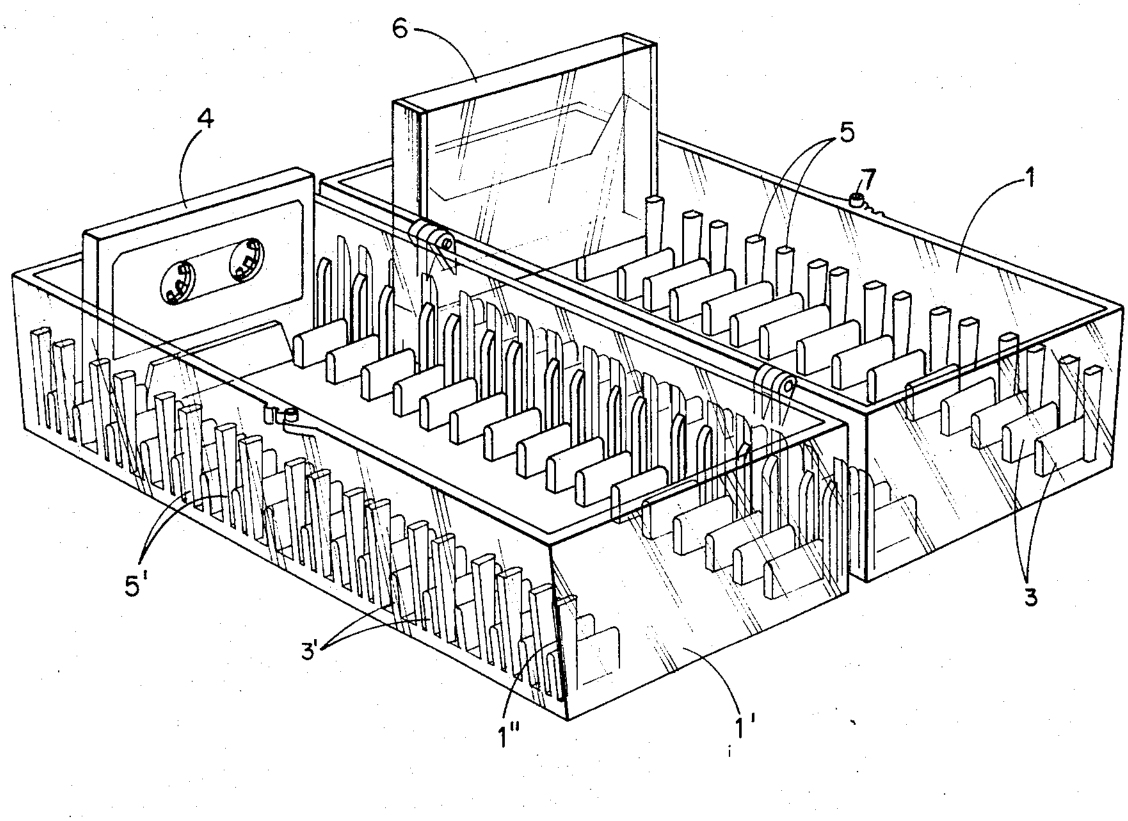

The invention will now be described with reference to the accompanying drawings, FIG. 1 of which is an isometric view of a preferred transparent embodiment of the invention; and FIGS. 2 and 3 are similar views of modifications.

Referring to FIGS. 1 to 3, the storage cases of the invention embodying bottom box portions 1 and top portions 1′ rearwardly hinged at 2 are illustrated in transparent form, with the walls, ribs and other structural portions molded, for example, from clear proprionate or other plastic, to enable ready external identification of the stored cassettes 4 and their boxes 6 or the like.

The bottom box portions 1 of the storage cases are of height less than that of either the cassette 4 or its box 6, of width between the front and rear walls slightly greater than the length of the cassette box 6, and of length many times the width of the cassettes and their boxes to accommodate in transverse, parallel storage a sizable number of assorted cassettes and/or their boxes in any relative quantities within the case dimensions. As more particularly shown in the embodiment of FIG. 3, the front face or wall of the top portion 1′ will be inclined outwardly to enable closing over the stored cassettes and their boxes and locking at 7.

In accordance with the invention, two similar sets of spaced horizontal position locking ribs 3 and 3′ of short vertical dimension (short compared with the total height of the case) are provided, shown integral with the bottom wall of the bottom case portion 1 and respectively extending inward a short horizontal distance (short compared with the width of the case) from the inner surfaces of the front and rear walls of the bottom box portion 1. The successive ribs 3 or 3′ are substantially equally longitudinally spaced from one another, with the same spacing between the left-most and right-most ribs and the respective left and right walls of the bottom box portion 1. The spacing, as is more evident from FIG. 2, is just slightly greater than the thickness or width of the cassette 4 in order reliably transversely to position, store and maintain the cassette against dislodging, in parallel stored locations within the case.

Two similar sets of spaced vertical locking ribs 5 and 5′ are also provided from the bottom wall vertically along the inner surfaces of said front and rear walls of the bottom box portion 1, defining spaces therebetween just slightly greater than the thickness or width of the cassette boxes 6 and with a horizontal rib 3 (or 3′) intermediately included therebetween in order reliably transversely to position, store and maintain the cassette boxes 6 against dislodging in parallel stored locations, but with the boxes 6 elevated above the bottom wall and resting and stabalized upon the intermediate horizontal ribs. For this purpose, the vertical ribs 5 (or 5′) are taller than the horizontal ribs, being an appreciable portion of the height of the front and rear walls, but of horizontal extent shorter than that of the horizontal ribs 3 (or 3′).

Thus any combination of cassettes or cassette boxes may be economically and conveniently stored in the same case. Double the storage capacity may be attained, moreover, by duplicating the rib structure in a top portion 1′ of substantially the same dimensions as the bottom box portion 1 of the case, as more particularly illustrated in FIG. 3 for the particular structure of FIG. 2. When the top portion is opened back upon itself, as in FIG. 3, such double storage capacity is offered.

The modified structure of FIG. 2 embodies pairs of vertical ribs 5 and 5′ which are again similar in dimensions and spacing, though those associated with the front wall may be of greater horizontal dimension to provide added stabilization for the stored boxes 6. Each pair of vertical ribs 5 (or 5′) straddles a horizontal rib 3 (or 3′), and the adjacent pairs of vertical ribs are spaced from one another such as intermediately to include a substantially central horizontal rib for uniform stabilizing of all the boxes 6 no matter where stored, and as distinguished from different degrees of stabilization afforded in the different positions of FIG. 1 wherein the intermediate horizontal ribs are not at the same place between each vertical rib.

Further modifications will also occur to those skilled in this art, and all such are considered to fall within the spirit and scope of the invention as defined in the appended claims.

What is claimed is:

1. A storage case for transversely storing magnetic tape cassettes and their boxes having, in combination, a substantially rectangular bottom box portion for receiving and storing such cassettes and their boxes in transverse parallel position and a rearwardly hinged top portion for the bottom box portion of the storage case; the bottom box portion being of height less than that of the tape cassettes and of their boxes, of width slightly greater than the length of the cassette boxes, and of length many times the width of the cassette boxes, and the top portion therefor being of height at least sufficient, when closed, to cover the cassettes and their boxes, transversely positioned within the case; two similar sets of spaced horizontal position locking ribs of short vertical dimension disposed upon the bottom wall of the storage case bottom box portion, respectively extending inward a short horizontal distance only from the inner surfaces of the front and rear walls of the bottom box portion with the successive ribs being substantially equally longitudinally spaced from one another, and with the ribs adjacent the side walls of the bottom box portion being similarly spaced, a distance just slightly greater than the width of the cassettes in order reliably transversely to position, store and maintain the same against dislodging in parallel locations within the case; and two similar sets of spaced vertical position locking rib means of longer vertical dimension than the horizontal ribs but of shorter horizontal dimension, respectively disposed from said bottom wall vertically along the inner surfaces of said front and rear walls of the bottom box portion, and defining spaces between vertical rib means just slightly greater than the width of the cassette boxes, such vertical rib means being positioned so as intermediately to include a horizontal rib therebetween in order reliably transversely to position, store and maintain the same against dislodging in parallel locations within the case, but with the boxes elevated above the said bottom wall and resting upon and stabilized by the intermediate horizontal ribs.

2. A storage case as claimed in claim 1 and in which said top portion is provided with an inclined front wall to enable closing over the stored cassettes and their boxes.

3. A storage case as claimed in claim 1 and in which said vertical position locking rib means comprise individual vertical ribs some coincident with the horizontal ribs and others intermediate the same.

4. A storage case as claimed in claim 1 and in which said vertical position locking rib means comprises pairs of vertical ribs each straddling a horizontal rib and spaced from one another with an adjacent horizontal rib substantially centrally intermediate adjacent pairs of vertical ribs.

5. A storage case as claimed in claim 4 and in which said top portion is of dimensions similar to the bottom portion and also contains said sets of horizontal and vertical position locking ribs to provide duplicate storage facilities to the bottom box portion when the top portion is opened back upon itself.

6. A storage case as claimed in claim 1 and in which said top portion is of dimensions similar to the bottom portion and also contains said sets of horizontal position locking ribs and vertical position locking rib means to provide duplicate storage facilities to the bottom box portion when the top portion is opened back upon itself.

7. A storage case as claimed in claim 1 and in which said walls, ribs and rib means are substantially transparent to enable identification of the stored contents.

* * * * *